United States Patent
Kim et al.

(10) Patent No.: US 6,781,934 B2
(45) Date of Patent: Aug. 24, 2004

(54) LASER DIODE UNIT FOR OPTICAL PICK-UP APPARATUS

(75) Inventors: Chul Min Kim, Seoul (KR); Hyung Joon Kim, Sungnam-si (KR)

(73) Assignee: LG Electronics, Inc., Seoul (KR)

(*) Notice: Subject to any disclaimer, the term of this patent is extended or adjusted under 35 U.S.C. 154(b) by 216 days.

(21) Appl. No.: 10/003,445

(22) Filed: Dec. 6, 2001

(65) Prior Publication Data

US 2002/0085282 A1 Jul. 4, 2002

(30) Foreign Application Priority Data

Dec. 29, 2000 (KR) .......................................... 2000-84999
Dec. 29, 2000 (KR) .......................................... 2000-85000

(51) Int. Cl.[7] .............................................. G11B 7/135
(52) U.S. Cl. .............................. 369/53.26; 369/112.07; 369/112.09; 369/112.1
(58) Field of Search .......................... 369/53.26, 112.1, 369/112.03, 112.07, 112.09, 112.08

(56) References Cited

U.S. PATENT DOCUMENTS

| | | | | |
|---|---|---|---|---|
| 4,245,882 A | * | 1/1981 | Chang | 359/19 |
| 5,689,108 A | * | 11/1997 | Ohyama | 250/239 |
| 5,777,971 A | * | 7/1998 | Choi | 369/112.08 |
| 5,982,515 A | * | 11/1999 | Stone et al. | 398/161 |
| 6,002,519 A | * | 12/1999 | Hayashi et al. | 359/557 |
| 6,023,448 A | * | 2/2000 | Tajiri et al. | 369/112.04 |
| 6,061,317 A | * | 5/2000 | Shodo | 369/53.26 |
| 6,108,109 A | * | 8/2000 | Chen et al. | 359/15 |
| 6,269,203 B1 | * | 7/2001 | Davies et al. | 385/24 |
| 6,678,078 B1 | * | 1/2004 | Popovich et al. | 359/15 |

* cited by examiner

Primary Examiner—Gautam R. Patel
(74) Attorney, Agent, or Firm—Birch, Stewart, Kolasch & Birch, LLP

(57) ABSTRACT

A laser diode unit for an optical pick-up apparatus includes a laser diode for emitting a laser beam; a monitor photodiode for controlling recording optical power; an optical disc on which data is written by the laser beam or from which data is read by the laser beam; and a lens module for reflecting a part of the light beam emitted, in the form of a divergent light beam, from the laser diode, thereby focusing the light beam onto the optical disc, the lens module also serving to transmit the remaining part of the light beam therethrough, thereby allowing the transmitted light beam to be converged by the monitor photodiode. The laser diode unit achieves a slimness of the optical pick-up apparatus while reducing the number of elements required for the laser diode unit and the number of process steps required in the manufacture of the laser diode unit.

4 Claims, 3 Drawing Sheets

LASER DIODE UNIT FOR OPTICAL PICK-UP APPARATUS

BACKGROUND OF THE INVENTION

This non-provisional application claims priority under 35 U.S.C. §119(a) on Patent Application No. 84999/2000 and Patent Application No. 85000/2000, both of which were filed in Korea on Dec. 29, 2000 and are herein incorporated by reference.

1. Field of the Invention

The present invention relates to an optical pick-up apparatus, and more particularly to a laser diode unit for an optical pick-up apparatus capable of applying a laser beam emitted from a laser diode to an optical disc and a monitor photodiode (PD) using an integral optical system.

2. Description of the Related Art

Generally, optical pick-up devices have an arrangement illustrated in FIG. 1.

FIG. 1 is a schematic view illustrating the structure of an optical system used in a general optical pick-up device.

Referring to FIG. 1, the optical pick-up device includes a laser diode 101 for emitting a laser beam, a monitor PD 102 for adjusting recording power, and a focusing lens 103 for focusing the laser beam emitted from the laser diode 101 onto the monitor PD 102. The optical pick-up device also includes a collimator lens 104 for converting the laser beam emitted from the laser diode 101 into a collimated beam, a mirror 105 for changing an optical path of the collimated beam emerging from the collimator lens 104 to allow the collimated beam to be irradiated onto an optical disc 107, and an objective lens 106 for focusing the collimated beam, reflected by the mirror 105, onto the optical disc 107 in the form of a beam spot.

In this case, the collimator lens 104, mirror 105, and objective lens 106 form an L-shaped optical system.

Now, the operation of the optical pick-up device having the above mentioned arrangement will be described. A laser beam emitted from the laser diode 101 is converted into a collimated beam by the collimator lens 104. The optical path of the collimated beam is changed by the mirror 105 so that the collimated beam is fed to the objective lens 106. The collimated beam is then focused onto a desired point on the optical disc 107 by the objective lens 106. Meanwhile, a part of the laser beam emitted from the laser diode 101 is converged by the focusing lens 103, and then made incident to the monitor PD 102 so as to provide information required for adjustment of optical recording power.

In the conventional optical pick-up device illustrated in FIG. 1, however, it is difficult to provide a slim structure because the optical system used in the pick-up device has an L-shaped structure.

In other words, the optical system used in this pick-up device should have a collimator lens in order to convert the laser beam emitted from the laser diode, that is, a divergent beam, into a collimated beam. The optical system should also have a mirror for changing the optical path of the collimated beam to allow the collimated beam to be fed to the objective lens adapted to focus the collimated beam onto the optical disc. For this reason, the optical system must have an L-shaped structure. In addition to the provision of the collimator lens and mirror, the pick-up device should also have a separate arrangement including a monitor PD and a focusing lens for the monitor PD. As a result, it is difficult for the optical pick-up device to have a slim structure.

SUMMARY OF THE INVENTION

Therefore, the present invention has been made in view of the above mentioned problems, and an object of the invention is to provide a package type laser diode unit capable of emitting a laser beam in the form of a collimated beam.

Another object of the invention is to provide a laser diode unit capable of converging a laser beam to allow the laser beam to be focused onto an optical disc, thereby realizing an optical pick-up having a super-slim structure.

Another object of the invention is to provide a laser diode unit having an integral optical system, thereby being capable of providing an optical pick-up having a slim, simple, and miniature structure.

In accordance with one aspect, the present invention provides a laser diode unit for an optical pick-up apparatus comprising: a laser diode for emitting a laser beam; a monitor photodiode for controlling recording optical power; an optical disc on which data is written by the laser beam or from which data is read by the laser beam; and a lens module for reflecting a part of the light beam emitted, in the form of a divergent light beam, from the laser diode, thereby focusing the light beam onto the optical disc, the lens module also serving to transmit the remaining part of the light beam therethrough, thereby allowing the transmitted light beam to be converged by the monitor photodiode.

The lens module may comprise a diffraction grating face for diffracting the divergent light beam emitted from the laser diode, a holographic optical element face for reflecting a part of the divergent light beam while transmitting the remaining part of the divergent light beam to the monitor photodiode, and a lens face arranged to face the optical disc and adapted to output the light beam reflected by the holographic optical element face.

The diffraction grating face may be arranged to face the laser diode while being integral with the laser diode. Alternatively, the diffraction grating face may face the laser diode while being spaced apart from the laser diode by a desired distance.

The lens face may have a structure for outputting the light beam reflected by the holographic optical element face in the form of a collimated light beam. Alternatively, the lens face may have a structure for converging the light beam reflected by the holographic optical element face.

In accordance with another aspect, the present invention provides a laser diode unit for an optical pick-up apparatus comprising: a laser diode for emitting a laser beam; a monitor photodiode for controlling recording optical power; an optical disc on which data is written by the laser beam or from which data is read by the laser beam; a first optical power lens face arranged to face the laser diode and adapted to reflect the light beam emitted, in the form of a divergent light beam, from the laser diode; a holographic optical element face for reflecting a part of the divergent light beam while transmitting the remaining part of the divergent light beam to the monitor photodiode; and a second optical power lens face arranged to face the optical disc and adapted to converge the light beam reflected by the holographic optical element.

The second optical power lens face may be a pseudo objective lens.

In accordance with another aspect, the present invention provides an integral optical package comprising: a diffraction grating face formed with a plurality of horizontally-extending diffraction grating portions, the diffraction grating face facing a laser diode while being attached to the laser diode; a holographic optical element defined with a thin diffraction region and a dense diffraction region arranged in a vertical direction, the holographic optical element being attached to a monitor photodiode; and a focusing lens face for converging a light beam reflected by the holographic optical element.

In accordance with another aspect, the present invention provides an integral optical package comprising: a diffraction grating face formed with a plurality of horizontally-extending diffraction grating portions; a holographic optical element defined with a thin diffraction region and a dense diffraction region arranged in a vertical direction, the holographic optical element being attached to a monitor photodiode; and a collimating lens face having a lens curvature for transmitting a light beam, reflected by the holographic optical element, in a collimated state.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

The present invention will now be described in detail with reference to various embodiments thereof.

[First Embodiment]

Figure 1:
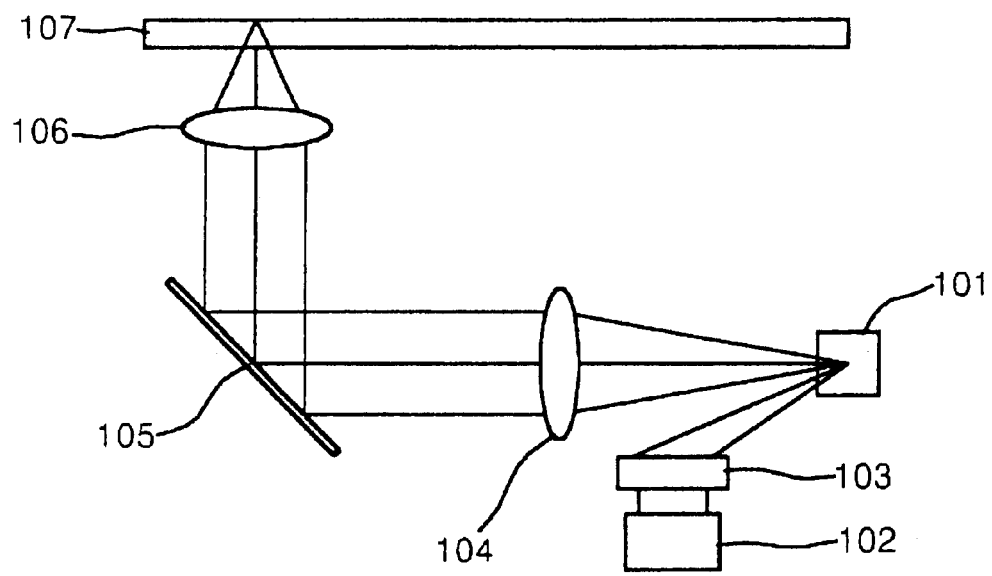
FIG. 1 is a schematic view illustrating the structure of an optical system used in a general optical pick-up device.
Figure 2:
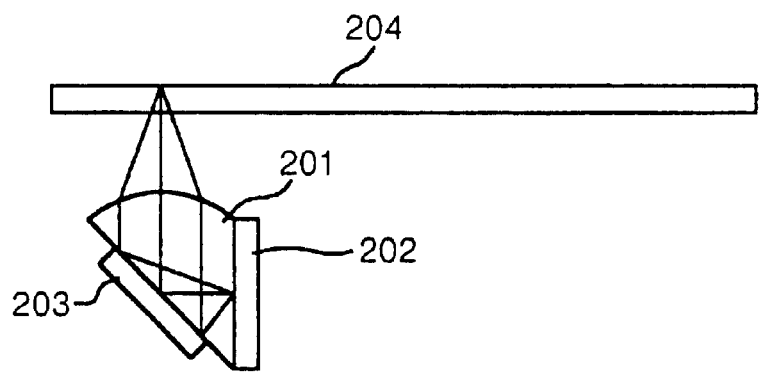
FIG. 2 is a schematic view illustrating a laser diode unit of an optical pick-up apparatus according to a first embodiment of the present invention.

FIG. 2 is a schematic view illustrating a laser diode unit of an optical pick-up apparatus according to a first embodiment of the present invention.

Referring to FIG. 2, an LD (Laser Diode) package base 200 is illustrated which has an LD fixing section 201 and a PD fixing section 203. A laser diode 202 and a monitor PD 204 are arranged on the LD and PD fixing sections 201 and 203, respectively. A lens module 205, which serves to convert a laser beam emitted from the laser diode 202 into a collimated beam, is arranged on an optical path extending from the laser diode 202 to an objective lens 206. The parallel beam emerging from the lens module 205 is focused onto a desired point on an optical disc 207 by the objective lens 206. The lens module 205 faces the laser diode 202 at one face thereof while facing the monitor PD at another face thereof. The beam output face of the lens module 205 faces the objective lens 206.

The lens module 205 will be described in more detail, in conjunction with FIG. 3.

Figure 3:
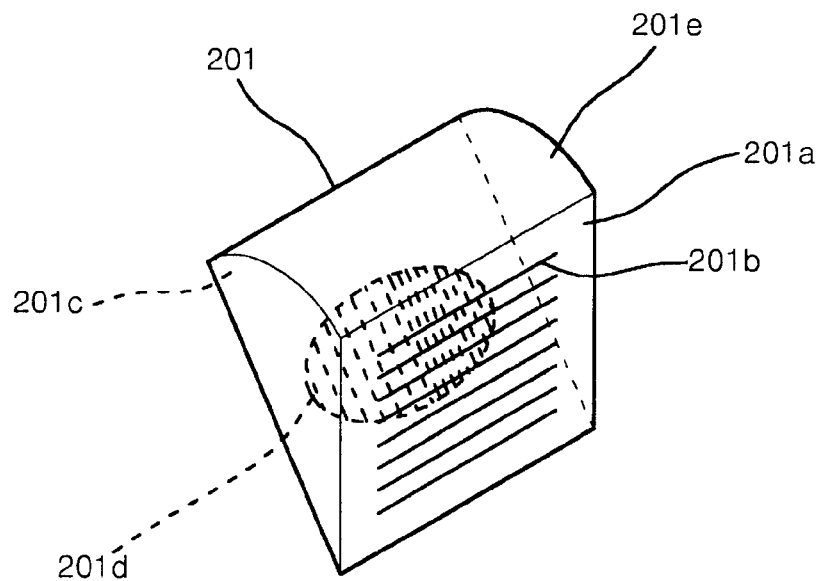
FIG. 3 is a perspective view illustrating the structure of the lens module in the laser diode unit according to the first embodiment of the present invention.

FIG. 3 is a perspective view illustrating the structure of the lens module in the laser diode unit according to the first embodiment of the present invention.

Referring to FIG. 3, the lens module 205 has a diffraction grating face 205a, a holographic optical element (HOE) face 205c, and a lens face 205e.

The diffraction grating face 205a is formed with a plurality of diffraction grating portions 205b each extending horizontally in the form of a linear groove while serving to diffract a divergent light beam received from the laser diode 202.

The HOE face 205c, which faces the monitor PD 204, reflects a part of the divergent light beam diffracted by the diffraction grating face 205a while transmitting the remaining part of the divergent light beam to the monitor PD 204. In order to achieve the reflection and transmission of the divergent light beam, the HOE face 205c is formed with a thin diffraction region and a dense diffraction region.

The lens face 205e serves to convert the light beam, reflected by the HOE face 205c, into a collimated light beam, and then to feed the collimated light beam to the objective lens 206.

Typically, the light incident to the lens face 205e may be converged or diverged in accordance with the curvature of the lens module 205.

Therefore, the lens face 205e should be designed, taking into consideration the curvature of the lens module 205, in order to covert the reflected light beam into a collimated light beam.

To this end, the lens face 205e is formed to be convex toward the optical disc 207 in accordance with a previously set lens curvature so as to convert the reflected light beam into a collimated light beam.

As shown in FIGS. 2 and 3, the laser beam emitted from the laser diode 202 is a divergent light beam. The divergent light beam from the laser diode 202 is incident to the lens module 205 to pass through the diffraction grating face 205a, reflected by the HOE face 205c, and then transmitted through the lens face 205e. The light beam emerging from the lens face 205e in the form of a collimated light beam is then incident to the objective lens 206. Finally, the incident collimated light beam is focused onto the optical disc 207, thereby forming an optical spot on the optical disc 207. By this optical spot, information can be written on the optical disc 207 or read from the optical disc 207.

Meanwhile, the divergent light beam from the laser diode 202 is partially transmitted through an HOE face 205d so that it is incident to the monitor PD 204. Since the divergent light beam directly enters the monitor PD 204, it is possible to converge the divergent light beam without using any separate focusing lens.

[Second Embodiment]

Figure 4:
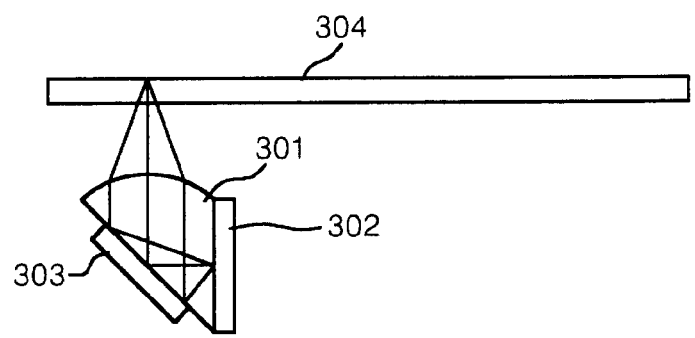
FIG. 4 is a schematic view illustrating a laser diode unit of an optical pick-up apparatus according to a second embodiment of the present invention.

FIG. 4 is a schematic view illustrating a laser diode unit of an optical pick-up apparatus according to a second embodiment of the present invention.

Referring to FIG. 4, a laser diode unit is illustrated, in which a lens module 301 forming an integral optical system, a laser diode 302, and a monitor PD 303 are coupled together to form an integral structure in accordance with the second embodiment of the present invention. In this laser diode unit, a laser beam emitted from the laser diode 302 is directly incident to the lens module 301. A part of the incident laser beam is fed to the monitor PD 303 whereas the remaining part of the incident laser beam is outputted from the lens module 301 in a focused state.

The laser diode 302 and monitor PD 303 are coupled to the lens module 301 to form an integral structure, as mentioned above. The lens module 301 has the same structure as that of FIG. 3. That is, the lens module 301 has a diffraction grating face corresponding to the diffraction grating face 205a, an HOE face corresponding to the HOE face 205c, and a lens face corresponding to the lens face 205e.

In the lens module 301, the diffraction grating face 205a is formed with a plurality of diffraction grating portions 205b each extending horizontally in the form of a linear groove while serving to diffract a divergent light beam received from the laser diode 302. In the lens module 301, the HOE face 205c faces the monitor PD 303 and reflects a part of the divergent light beam diffracted by the diffraction grating face 205a while transmitting the remaining part of the divergent light beam to the monitor PD 303. In order to achieve the reflection and transmission of the divergent light beam, the HOE face 205c is formed with a thin diffraction region and a dense diffraction region.

The diffraction grating face 205a and the surface of the laser diode 302 facing the diffraction grating face 205a may be easily bonded together using an optical bond. Using the same optical bond, the HOE face 205c and the surface of the monitor PD 303 may also be easily bonded together.

The lens face of the lens module 301 is different from the lens face 205e of FIG. 3. That is, the lens face of the lens module 301 is a focusing lens face having a desired lens curvature to directly converge the light beam reflected by the HOE face 205c. In this embodiment, therefore, the reflected light beam can be outputted in a converged state by virtue of the lens face having a predetermined lens curvature.

As mentioned above, the diffraction grating face 205a is coupled with the laser diode 302 in such a fashion that it is in contact with the laser diode 302. Also, the HOE face 205c is coupled with the monitor PD 303 in such a fashion that it is in contact with the monitor PD 303.

Accordingly, the laser beam emitted from the laser diode 302 is directly transmitted through the diffraction grating face 205a. The transmitted laser beam is partially transmitted through the HOE face 205c so that it is incident to the monitor PD 303. The remaining part of the laser beam is reflected by the HOE face 205c, and then converged by the focusing lens surface so that it is focused onto the optical disc 304.

As shown in FIG. 4, the divergent light beam emitted from the laser diode 302 contacting the diffraction grating face 205a of the lens module 301 is directly transmitted through the diffraction grating face 205a, reflected by the HOE face 205c, and then converged while passing through the focusing objective lens face, so that it is focused onto the optical disc 304.

Meanwhile, the divergent light beam from the laser diode 302 is partially transmitted through an HOE face 205d so that it is incident to the monitor PD 303. Since the divergent light beam directly enters the monitor PD 303, it is possible to converge the divergent light beam without using any separate focusing lens, thereby reducing the number of elements used in the laser diode unit.

[Third Embodiment]

Figure 5:
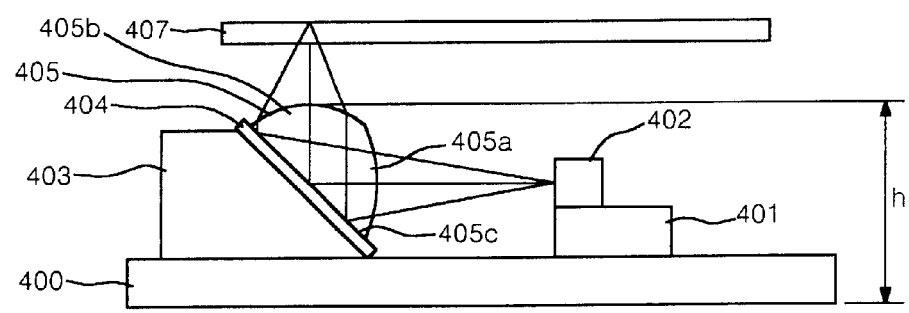
FIG. 5 is a schematic view illustrating a laser diode unit of an optical pick-up apparatus according to a third embodiment of the present invention.

FIG. 5 is a schematic view illustrating a laser diode unit of an optical pick-up apparatus according to a third embodiment of the present invention.

The laser diode unit shown in to FIG. 5 is substantially similar to that of FIG. 2. However, this laser diode unit has an arrangement different from that of FIG. 2 in that it uses a lens module adapted to output a converged light beam, thereby being capable of dispensing with any objective lens.

Now, the laser diode unit according to the third embodiment will be described mainly in conjunction with the lens module.

As shown in FIG. 5, the lens module, which is denoted by the reference numeral 405, has a first optical power lens face 405a, a second optical power lens face 405b, and an HOE face 405c.

The first optical power lens face 405a has a desired lens curvature to reflect a divergent light beam received from a laser diode 402. The light beam passing through the first optical power lens face 405a is incident to the HOE face 405c throughout the entire region of the HOE face 405c by virtue of the lens curvature of the first optical power lens face 405a.

The HOE face 405c faces a monitor PD 404 and has a diffraction grating structure formed with a thin diffraction region and a dense diffraction region.

The second optical power lens face 405b faces an optical disc 407. This second optical power lens face 405b may serve as a pseudo objective lens to output the light beam, reflected by the HOE face 405c, in a focused state.

Here, the pseudo objective lens means a lens performing a well-known objective lens function for focusing a light beam.

The second optical power lens face 405b must have a lens curvature in order to focus the light beam reflected by the HOE face 405c.

As shown in FIG. 5, the laser beam emitted from the laser diode 402 is refracted by the first optical power lens face 405a of the lens module 405, reflected by the HOE face 405c, and then converged by the second optical power lens face 405b (namely, the pseudo objective lens). Thus, the laser beam is focused onto the optical disc 407.

Meanwhile, the divergent laser beam from the laser diode 402 is partially transmitted through the HOE face 405c. The transmitted laser beam is incident to the monitor PD 404, thereby providing information required for controlling recording optical power.

Since the lens module, which forms an integral lens module, is provided with two optical power faces in accordance with the third embodiment of the present invention, it is possible to convert a laser beam into a collimated beam and to focus the collimated beam, thereby realizing a super-slim pick-up.

As apparent from the above description, the present invention provides a laser diode unit for an optical pick-up apparatus which has an integral optical system, thereby being capable of providing an optical pick-up having a slim structure.

Since the optical system of the laser diode unit according to the present invention can output a converged light beam, it is unnecessary to use any objective lens. Accordingly, it is possible to reduce the number of elements required for the laser diode unit while reducing the number of process steps required in the manufacture of the laser diode unit.

In accordance with the laser diode unit of the present invention, the light beam incident to the lens module of the laser diode unit is partially split by the HOE face of the lens module so that it is directly incident to the monitor PD. Accordingly, it is unnecessary to use any focusing lens. As a result, it is possible to minimize the assembling deviation occurring in the process of assembling the elements of the laser diode unit, thereby minimizing the deviation in the amount of light on the monitor PD.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A laser diode unit for an optical pick-up apparatus comprising:

a laser diode for emitting a laser beam;

a monitor photodiode for controlling recording optical power;

an optical disc on which data is written by the laser beam or from which data is read by the laser beam;

a first optical power lens face arranged to face the laser diode and adapted to pass the light beam emitted, in the form of a divergent light beam, from the laser diode;

a holographic optical element face for reflecting a part of the divergent light beam while transmitting the remaining part of the divergent light beam to the monitor photodiode, wherein the divergent light beam from the first optical element face is directly incident to the holographic optical element face; and a second optical power lens face arranged to face the optical disc and adapted to converge the light beam reflected by the holographic optical element.

2. The laser diode unit according to claim 1, wherein the second optical power lens face is a pseudo objective lens.

3. The laser diode unit according to claim 1, wherein the first optical power lens face has a desired lens curvature to diffract the divergent light beam emitted from the laser diode.

4. The laser diode unit according to claim 1, wherein the holographic optical element face is defined with a thin diffraction region and a dense diffraction region.

* * * * *